US011461502B2

(12) United States Patent
Irvine et al.

(10) Patent No.: US 11,461,502 B2
(45) Date of Patent: Oct. 4, 2022

(54) APPARATUS AND METHOD OF CREATING A DATA CHAIN IN A DATA STRUCTURE THAT CAN BE CRYPTOGRAPHICALLY PROVEN TO CONTAIN VALID DATA

(71) Applicant: The Maidsafe Foundation, Ayr (GB)

(72) Inventors: David Irvine, Troon (GB); Vivekanand Rajkumar, Troon (GB); Andreas Fackler, Prague (CZ)

(73) Assignee: The Maidsafe Foundation, Ayr (GB)

( * ) Notice: Subject to any disclaimer, the term of this patent is extended or adjusted under 35 U.S.C. 154(b) by 435 days.

(21) Appl. No.: 16/304,180

(22) PCT Filed: May 23, 2017

(86) PCT No.: PCT/EP2017/025142
§ 371 (c)(1),
(2) Date: Nov. 23, 2018

(87) PCT Pub. No.: WO2017/202503
PCT Pub. Date: Nov. 30, 2017

(65) Prior Publication Data
US 2020/0320225 A1 Oct. 8, 2020

(30) Foreign Application Priority Data

May 23, 2016 (GB) .................................... 1609059

(51) Int. Cl.
*H04L 29/06* (2006.01)
*G06F 21/64* (2013.01)
(Continued)

(52) U.S. Cl.
CPC ................ *G06F 21/64* (2013.01); *H04L 9/30* (2013.01); *H04L 9/3226* (2013.01); *H04L 9/50* (2022.05)

(58) Field of Classification Search
CPC . H04L 9/00; H04L 9/30; H04L 9/3226; H04L 2209/38; H04W 12/00; G06F 21/00; G06F 21/64
See application file for complete search history.

(56) References Cited

U.S. PATENT DOCUMENTS 10,304,143 B2 * 5/2019 Kasper .................. H04L 63/123
2011/0083015 A1 4/2011 Meier
(Continued)

FOREIGN PATENT DOCUMENTS

WO 2009/115903 A1 9/2009

OTHER PUBLICATIONS

Eyal, Ittay, et al, "Bitcoin-NG: A Scalable Blockchain Protocol", Proceedings of the 13th USENIX Symposium on Networked Systems Design and Implementation (NSDI'16), Mar. 16, 2016. pp. 45-59. Retrieved from the Internet:—URL:https://www.usenix.org/system/files/conference/nsdi16/nsdi16-paper-eyal.pdf.
(Continued)

*Primary Examiner* — Joseph P Hirl
*Assistant Examiner* — Leynna Truvan

(57) ABSTRACT

An apparatus is adapted for implementing a method of creating a data chain, which can be cryptographically proven to contain valid data. The method includes creating a data chain with no elements, validating the data chain for nodes before accepting the data chain, verifying the size of close group to add the data chain, adding a data block to the data chain, removing old copies of entries from the data chain only if a chained consensus would not be broken, else maintaining the entry and marking it as deleted, validating a majority of pre-existing nodes and validating a signature of the data chain via the data chain of signed elements. The apparatus is operable to support a data communication system and provides a technical effect of making a data
(Continued)

processing system robust against data corruption, data loss, failure in data communication synchronization and similar practical operational issues.

16 Claims, 5 Drawing Sheets

(51) Int. Cl.
*H04L 9/30* (2006.01)
*H04L 9/32* (2006.01)
*H04L 9/00* (2022.01)

(56) References Cited

U.S. PATENT DOCUMENTS

2017/0187535 A1* 6/2017 Middleton ............ H04L 9/3247
2017/0237570 A1* 8/2017 Vandervort ............ G16H 10/60
713/176

OTHER PUBLICATIONS

Eyal, Ittay, et al, "Majority is not Enough: Bitcoin Mining is Vulnerable", Nov. 15, 2013, 17 pages. Retrieved from the Internet:—URL:https://arxiv.org/pdf/1311.0243.pdf.

International Search Report and Written Opinion of the International Search Authority received for International Application No. PCT/EP2017/025142, dated Aug. 8, 2017, 13 pages.

International Search Report and Written Opinion of the International Search Authority received for International Application No. PCT/EP2017/025142, dated Nov. 27, 2018, 7 pages.

Narayanan, Arvind, et al, "Bitcoin and Cryptocurrency Technologies", Feb. 9, 2016, 308 pages. Retrieved from the Internet:—URL:https://d28rh4a8wq0iu5.cloudfront.net/bitcointech/readings/princeton_bitcoin_book.pdf.

* cited by examiner

APPARATUS AND METHOD OF CREATING A DATA CHAIN IN A DATA STRUCTURE THAT CAN BE CRYPTOGRAPHICALLY PROVEN TO CONTAIN VALID DATA

TECHNICAL FIELD

The present disclosure generally concerns apparatus that are operable to create a data chain in a data structure that can be cryptographically proven to contain valid data; such apparatus is capable of providing a technical effect of making a data processing system robust against data corruption, data loss, failure in data communication synchronization and similar practical operational issues. Moreover, the present disclosure relates to methods of creating a data chain in a data structure that can be cryptographically proven to contain valid data identifiers that can securely allow the actual data to be republished onto a decentralized network. Furthermore, the present disclosure concerns computer program products comprising a non-transitory computer-readable storage medium having computer-readable instructions stored thereon, the computer-readable instructions being executable by a computerized device comprising processing hardware to execute aforesaid methods.

BACKGROUND

Various apparatus for encoding input data to generate corresponding encoded data, and likewise various apparatus for decoding encoded data to generate corresponding decoded data have been described in earlier patent applications for which patent rights have been granted, even despite the input data being potentially of an abstract nature (for example, computer-generated graphical image data) and the encoders merely manipulating bits present in the input data, effectively to transform them into other types of data. Patent authorities consider such data manipulation, and apparatus for performing such data manipulation, to relate to a technical effect. Such encoders and decoders, for example, are frequently employed in telecommunication systems, that have been protected by granted patent rights.

Peer-to-peer (P2P) computing or networking is a distributed application architecture that partitions tasks or workloads between peers. The peers are equally privileged, equipotent participants in the application architecture. The peers are said to form a peer-to-peer network of nodes. Moreover, the peers make a portion of their resources, such as processing power, disk storage or network bandwidth, directly available to other network participants, without a need for central coordination by servers or stable hosts. Decentralized networks are peer-to-peer networks that are built using VPNs and software/hardware BGP routers to each individual workstation, or office location.

Kademlia® is a distributed hash table for decentralized peer-to-peer computer networks. Moreover, Kademlia® specifies a structure of a given network and exchange of information through node lookups. Moreover, Kademlia® nodes communicate among themselves using the UDP (User Datagram Protocol). Such participant nodes form a virtual or overlay network. A number or node ID identifies each participant node. Typically, in communication networks, a node is a connection point, a redistribution point, or a communication endpoint. In a physical network, a node is an active electronic device that is attached to a network, and is capable of creating, receiving, or transmitting information over a communications channel.

A hash table is a data structure that is used to implement an associative array, namely a structure that can map keys to values. A hash table uses a hash function to compute an index into an array of buckets or slots, from which the desired value can be found. A distributed hash table (DHT) is a class of a decentralized distributed system that provides a lookup service similar to a hash table; pairs are stored in a DHT, and any participating node can efficiently retrieve the value associated with a given key. A cryptographic hash function is a mathematical algorithm that maps data of arbitrary size to a bit string of a fixed size (for example, a hash function) which is designed to be also a one-way function, that is, a function which is infeasible to invert.

A churn event is a movement of data that results from a node switching off and the data being relocated to a live node. During such a churn event, a large amount of data has to be transferred to backup or replicant live nodes, which is a major challenge. It is important for the data to be cryptographically proven to be valid. Moreover, the large amount of data has to be republished in a secure manner, which is a particularly challenging problem to solve in a decentralized network. While maintaining the large amount of data, the nodes need to be started and the data has to be made available in the nodes. Decentralized networks typically lack an ability to recover easily from a full system outage, such as a full network collapse, or worldwide power outage. Furthermore, even immediate system-wide upgrades are also not possible in a decentralized network.

Therefore, in light of foregoing drawbacks associated with known systems and methods, there exists a need to overcome the aforementioned drawbacks associated with existing approaches for storing data in data structures at nodes on a decentralized network, particularly since data has to be cryptographically proven to contain valid data that was previously put onto the network securely and not injected by an attacker, or error.

SUMMARY

The present disclosure seeks to provide an apparatus including one or more processors, where the one or more processors are operable to utilize one or more non-transitory computer readable storage mediums storing one or more sequences of instructions, characterized in that execution of the one or more sequences of instructions in the one or more processors causes creation of a data chain which can be cryptographically proven to contain valid data, the instructions being configured to perform steps of:
creating a data chain with no elements;
validating the data chain for nodes before accepting the data chain;
verifying a size of a close group to add the data chain;
adding a data block to the data chain;
injecting new elements into the chain that represents a current close group of the data element;
validating a majority of pre-existing nodes; and
validating a signature of the data chain via the data chain of signed elements.

The present disclosure seeks to provide an apparatus including one or more processors, where the one or more processors are operable to utilize one or more non-transitory computer readable storage mediums storing one or more sequences of instructions, characterized in that execution of the one or more sequences of instructions in the one or more processors causes creation of a data chain which can be cryptographically proven to contain valid data, the instructions being configured to perform steps of:

creating a data chain with no elements;
validating the data chain for nodes before accepting the data chain;
verifying a size of a close group to add the data chain;
adding a data block to the data chain;
injecting new elements into the chain that represents a current close group of the data element;
validating a majority of pre-existing nodes; and
validating a signature of the data chain via the data chain of signed elements.

Embodiments of the present disclosure are capable of substantially eliminating, or at least partially addressing, the aforementioned drawbacks, namely problems, in the prior art, and enabling cryptographic validation on a decentralized network to be achieved to ensure that a data structure has cryptographically valid data while relocating the data from a switching off node to a live node during a churn event.

According to another aspect, there is provided a method of creating a data chain which can be cryptographically proven to contain valid data in an apparatus including one or more processors, characterized in that the method comprises:
creating a data chain with no elements;
validating the data chain for nodes before accepting the data chain; verifying a size of a close group to add the data chain;
adding a data block to the data chain;
removing old copies of entries from the data chain only if a chained consensus would not be broken, else maintaining the entry and marking it as deleted;
validating a majority of pre existing nodes; and
validating a signature of the data chain via the data chain of signed elements.

According to another aspect, there is provided a computer program product comprising a non-transitory computer-readable storage medium having computer-readable instructions stored thereon, the computer-readable instructions being executable by a computerized device comprising processing hardware to execute the aforesaid method.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 3 is an illustration of a hardware environment for practicing the embodiments of the present disclosure; and.

Figure 1:
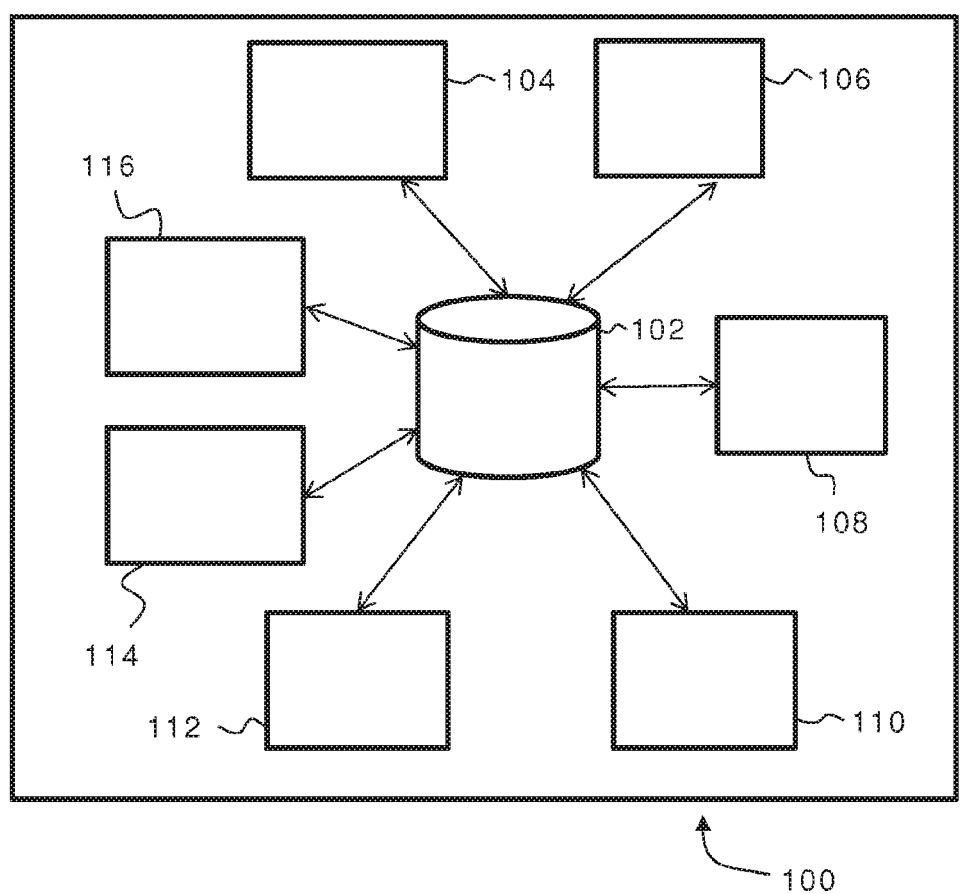
FIG. 1 is an illustration of a module of an apparatus for creating a data chain which is cryptographically validated in a decentralized network, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Definitions used in the present disclosure are described below:

A decentralised network is a peer-to-peer ("P2P") network in XOR space, using Kademlia® type addressing. A hash is a cryptographic one-way function that produces a fixed length representation of any input. Immutable data is a data type that has a name, and a hash of data contents. It is immutable as changing the contents creates a new piece of immutable data. Structured data is a data type that has a fixed name, but mutable contents. GROUP_SIZE is the number of nodes surrounding a network address. QUORUM is the number of the GROUP that is considered large enough that a decision is valid and the number is considered a majority (i.e. (GROUP_SIZE/2)+1). Chain consensus is based on the fact that QUORUM number of signatories exist in the next link (data block) that also exist in the previous block. A churn event is a movement of data that results from a node switching off and the data being relocated to a 'live' node. A data identifier is an identifier that cryptographically assures the data identifier points to exactly one unique piece of data and no other piece of data can match that identifier. A simple representation would be a dataIdentifier containing a hash of a given data element itself.

In one aspect, there is provided one or more non-transitory computer readable storage mediums storing one or more sequences of instructions, which when executed by one or more processors, causes creation of a data chain which can be cryptographically proven to contain valid data, the instructions being configured to perform steps of:
(a) creating a data chain with no elements,
(b) validating the data chain for nodes before accepting the data chain,
(c) verifying a size of a close group to add the data chain,
(d) adding a data block to the data chain,
(e) ensuring new elements are injected into the chain (namely, a link) that represents the current close group of the data element,
(f) validating a majority of pre existing nodes, and
(g) validating a signature of the data chain via the data chain of signed elements.

The steps (a) to (g) are, for example, executed in data processing apparatus that is operable to ensure stable and reliable operation of a data processing system, for example in an event of disruption or unexpected execution crashing of the data processing system.

In an embodiment, the instructions are further configured to verify non-deleted blocks.

According to one embodiment, a data identifier validates the data chain.

According to another embodiment, the data identifier cryptographically validates the data chain.

According to another embodiment, the data identifier is an object that can uniquely identify and validate the data chain.

According to another embodiment, a node data block of the data identifier comprises a public key or a signature pair.

According to another embodiment, the instructions are further configured to prove the public key to be the key that signed the data identifier using the signature as a proof.

According to another embodiment, the instructions are further configured:
(i) to check an entry in (a) a cache of one or more data blocks, and (b) the data chain, wherein a receiving node checks for the entry in (a) a cache of one or more data blocks and (b) the data chain on receipt of the node data block;
(ii) to add the node to data block when finding the entry in (a) a cache of one or more data blocks, and (b) the data chain; and
(iii) to create a new data block entry in the cache and awaits further notifications from group members of a data identifier when the entry is not identified.

According to another embodiment, the instructions are further configured:
(i) to insert the data block into the data chain when a majority of signatories are accumulated in the data chain;
(ii) to validate the data chain via the chain of signed elements where there is a majority of signatures; and
(iii) to maintain a security of each churn event in the each node in a new group by signing an entry in the data chain in the current group.

According to another embodiment, the data chain is validated at each step. The chain of majority signatures may show the entire chain is valid from the first element to the last element.

According to another embodiment, the data descriptors (namely, the data chain) are added to the data node that held on a decentralised network.

According to another embodiment, the data chains are cryptographically secured in lock step using a consensus of cryptographic signatures.

According to another embodiment, the signatures are of a certain size GROUP_SIZE (for example, 12 nodes) with a QUORUM (for example, 7 nodes) required to be considered valid (much like N of P sharing).

According to another embodiment, the decentralised network that includes secured groups and these signatures of the secured groups are closest to the holder of the data chain.

According to another embodiment, the data chain includes a majority of existing group members if data chain is re-published prior to more than GROUP_SIZE.

According to another embodiment, the group size is U64.

According to another embodiment, a cryptographic proof of the data is validity for changing of QUORUM nodes.

According to another embodiment, the entries are signed by an ever changing majority of pre-existing nodes when the data chain starts.

According to another embodiment, the majority of the different signatories are cryptographically confirmed and/or validated when the data chain springs up.

According to another embodiment, the cryptographic validation is continued to the top of the data chain which includes entries signed by the majority of the current close group of nodes.

According to another embodiment, the current group of nodes is cryptographically validating the entire chain and every data element associated with data chain.

According to another embodiment, the groups change and the network grows, or indeed shrinks, many chains that associated with various nodes include a common element, which allows the data chains to be cross referenced in order to develop a complete picture of data from the start of the decentralized network.

According to another embodiment, the data chain of verifiable data elements provides a provable sequence of data validity and also the sequence of such data appearing on the decentralized network.

According to another embodiment, the chained majority agreement validates the ability for the data chain to be validated and allows the data to be republished on the decentralized network.

According to another embodiment, a data structure includes a data identifier object, a node data block, a data block, and a data chain.

According to another embodiment, in the data identifier object: a data chain is a chained list of one or more data block's which includes data identifiers that have been cryptographically validated.

According to another embodiment, a data identifier is an object that is uniquely identifies and validates a data item.

According to another embodiment, the data identifiers include cryptographic hash of the underlying data item.

According to another embodiment, the data identifiers include additional information such as name, version, and so forth.

According to another embodiment, in node data block; the data identifier of each node data block includes a public key/signature pair.

According to another embodiment, the public key is proven to be the key that signed the data identifier using the signature as a proof.

According to another embodiment, the node data block includes the public key is in fact the node name of a node close to the data identifier.

According to another embodiment, the data identifier communicated by any group member when data is 'Put', 'Post' or ' Delete' in the group.

According to another embodiment, a UTC timestamp associated with the node data block to note time of the data being put on the decentralized network.

According to another embodiment, an eventual consistency network, the UTC timestamp is the median value of a sorted list of timestamps per data block.

According to another embodiment, the data block is created using data nodes in the decentralized network.

According to another embodiment, the data nodes are communicated to holders of data chains using the decentralized network.

According to another embodiment, in data block: a receiving node checking an entry in:
(i) a cache of one or more data blocks; and
(ii) the data chain.

According to another embodiment, the receiving node checks for the entry in:

(i) a cache of the one or more data blocks; and
(ii) the data chain on receipt of the node data block.

According to another embodiment, the receiving node adds the node to the data block when the receiving node finding the entry in:
(i) a cache of the one or more data blocks; and
(ii) the data chain.

According to another embodiment, the receiving node creates a new data block entry in the cache and awaits for further notifications from group members of the data identifier when the entry is not identified.

According to another embodiment, the node array includes at least QUORUM members and be of CLOSE_GROUP length.

According to another embodiment, node array includes nodes that are close to the data element described by the data identifier.

According to another embodiment, in data chain; on accumulation of a majority of signatories, the data block is inserted into the data chain.

According to another embodiment, the data block remain in the cache and awaits for further node data block's if the data block cannot be added yet to the data chain due to lack of a majority consensus.

According to another embodiment, the data chain is validated via a chain of signed elements where there is a majority of signatures in agreement at each step.

According to another embodiment, the chain of majority signatures shows that the entire chain is valid from the first element to the last element.

According to another embodiment, due to the fact the current group associated with a majority of current members in agreement with the previous entry.

According to another embodiment, an entry in the data chain in the current group is signed to maintain the security of each churn event in the each node in a new group, According to another embodiment, the nodes in the current group comprise a relation with the data chain.

According to another embodiment, on every churn event, each node in the new group must sign an entry in the data chain to ensure no nodes can be later inserted into the data chain.

According to another embodiment, there are several mechanisms to allow insertion of nodes in the data chain as a parallel data chain of nodes and groups or indeed insert into the data chain that is a special data block which is in fact the group agreement block.

According to another embodiment, the duplicate entries are allowed to exist from the data chain to maintain integrity of the data chain.

According to another embodiment, in normal circumstances the duplicate entries are not exist in the data chain, as the data chains are grown only with successful Put, Post or Delete.

According to another embodiment, the delete event removes the entry from the data chain without breaking the consensus of data chain.

According to another embodiment, deleting the entry causes a gap in the data chain consensus.

According to another embodiment, to effectively breaking the chain, the entry is maintained in the data chain and marked as deleted.

According to another embodiment, the actual data is deleted from any disk cache.

According to another embodiment, in the decentralized network, a large improvement in stability and ability for failure recovery can be improved.

According to another embodiment, each node of the decentralized network stores the nodes that are connected to node of the decentralized network.

According to another embodiment, the node stores a public key and security key on disk along with its data and associated a data chain.

According to another embodiment, on start-up of a given decentralized network, the node attempts to reconnect to the last address recorded in the node and present in the data chain.

According to another embodiment, the group can decide whether or not the node is allowed to join the group.

According to another embodiment, the node may have to join the network again by being allocating a new address.

According to another embodiment, group makes the decision on the length of the nodes data chain.

According to another embodiment, three (for example) large nodes (Archive nodes) can exist per group, the node can join with the group if the node has the data chain longer than the third longest data chain in the group.

According to another embodiment, the nodes are attempts to hold persistent data and all local data can be accumulated in named directories.

According to another embodiment, on starting of decentralized network the data will be useful if the node can rejoin a group.

According to another embodiment, if a node is rejected and forced to rejoin the network with a new ID then a new named directory can be created and this allows nodes to clean up unused directories effectively.

According to another embodiment, the nodes are retaining a list of previously connected nodes, and nodes that previously attempt to rejoin a group.

According to another embodiment, each node can use its remembered list of previously known node names to validate the majority without the other nodes existing.

According to another embodiment, the offline validation for a node does not allow the validation to be sent to another node.

According to another embodiment, the remainder of the old group should have to form again to provide full validation.

The present disclosure can be applied to any electronic data. For example the embodiments can be used to efficiently re-publish data in a secure fashion. Embodiments can also be used to improve stability and ability for failure recovery on the decentralized network. Embodiment can also be used to securely republish the data in a decentralized network.

DETAILED DESCRIPTION OF THE DRAWINGS

In FIG. 1, there is shown a module diagram 100 that illustrates a process of creating a data chain (namely, creation of a data chain), which is cryptographically validated in a decentralized network, in accordance with an embodiment of the present disclosure. The module diagram 100 includes a data chain validation database 102, a data chain creation module 104, a data chain validation module 106, a close group verification module 108, a data block addition module 110, an old data deletion module 112, a majority validation module 114, and a signature validation module 116; it will be appreciated that the modules 104, 106, 108, 110, 112, 114, 116 are susceptible to being implemented as a combination of digital hardware and software products. The data chain validation database 102 stores a node data, name of node data, version of node data, a public key/signature pair, data identifier, and so forth.

In operation, the data chain creation module 104 creates a data chain with no elements. The data chain validation module 106 validates the data chain for nodes before accepting the data chain. The close group verification module 108 verifies the size of close group to add the data chain. The data block addition module 110 adds a data block to the data chain. The old data deletion module 112 deletes/removes old copies of the data from the data chain. The old data deletion module 112 maintains consensus of the data chain by keeping the data in the data chain and marked as deleted. The majority validation module 114 validates a majority of pre-existing nodes. The signature validation module 116 validates a signature of the data chain via the data chain of signed elements.

Figure 2A:
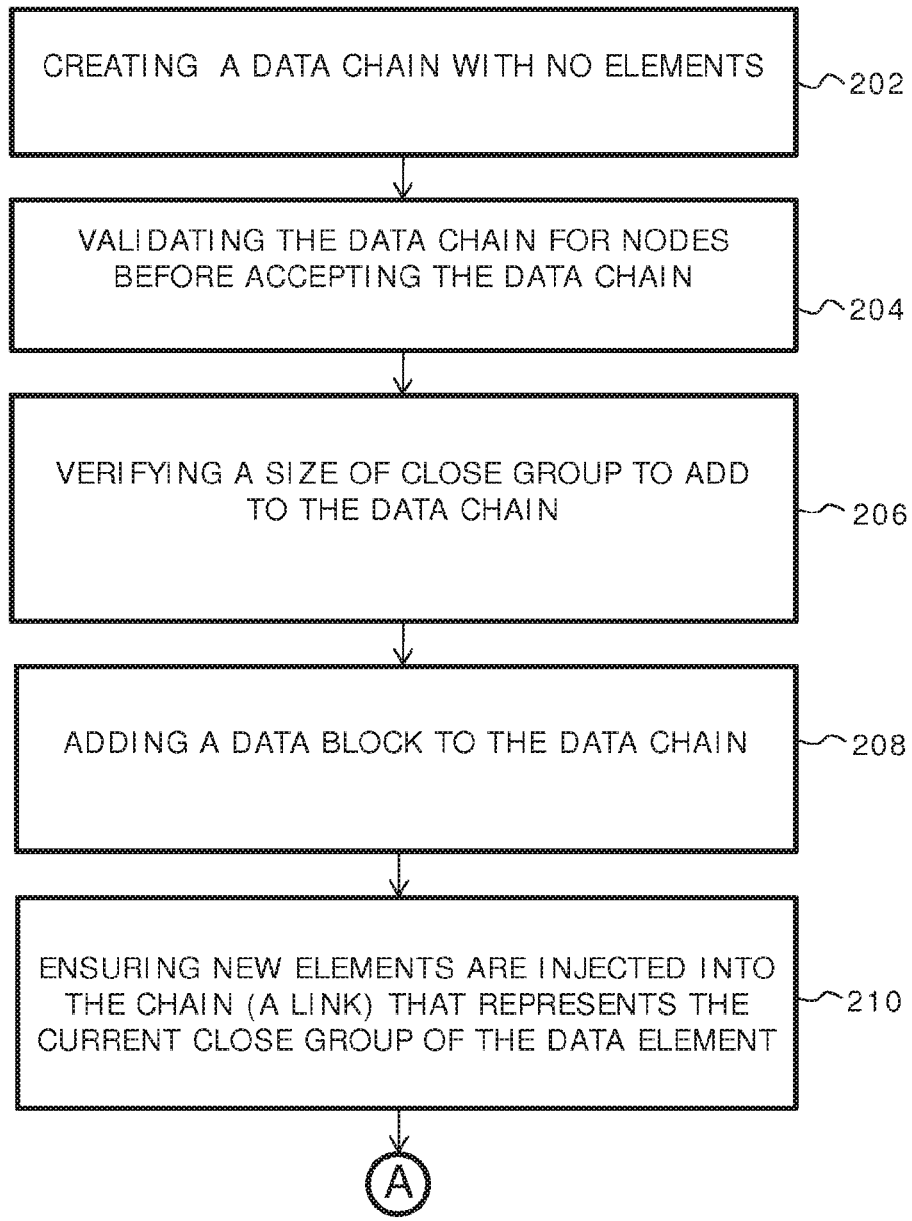
FIG. 2 is a flow diagram that illustrates a method of creating a data chain which is cryptographically validated in the decentralized network, in accordance with an embodiment of the present disclosure.
Figure 2B:
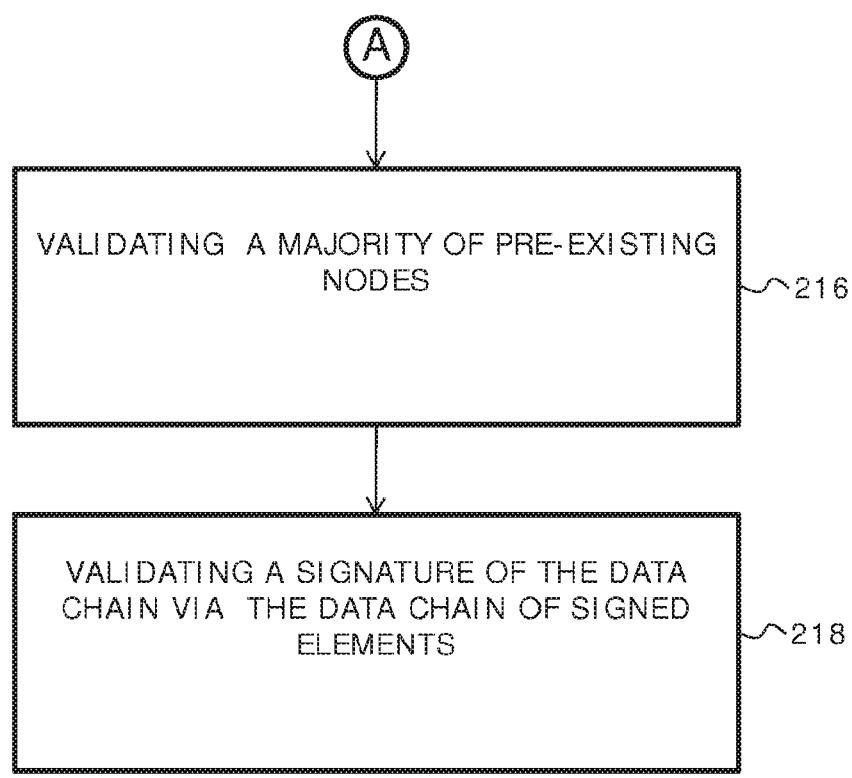

In FIG. 2, there is shown a flow diagram that illustrates a method for (namely, a method of) creating a data chain, which is cryptographically validated, in the decentralized network, in accordance with an embodiment of the present disclosure. At a step 202, a data chain is created with no elements in a data structure of a decentralized network. At a step 204, the data chain is validated by the data nodes before accepting the data chain. At a step 206, a size of close group is verified to add the data chain to the data nodes. At a step 208, a data block (namely, link) is added to the data chain by the close group representing the data element. At a step 210, old copies of data's are removed from the data chain. At a step 212, a majority of pre-existing nodes are validated to add a data chain to the data node. At a step 214, a signature of the data chain is validated via the data chain of signed elements.

Figure 3:
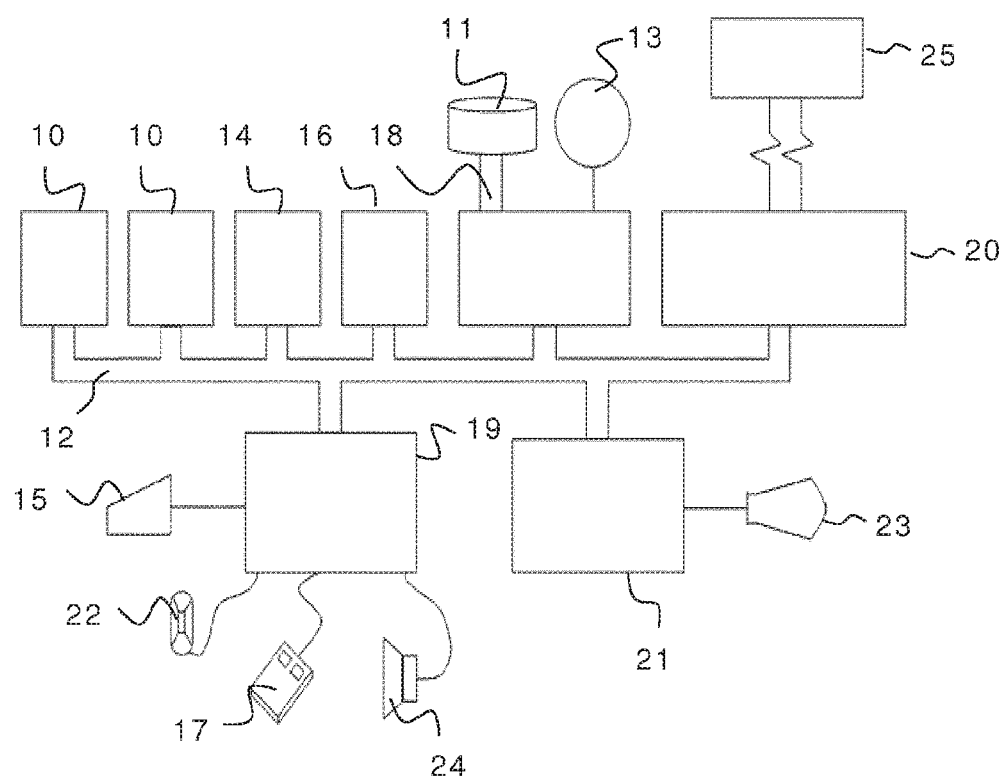

A representative hardware environment for practicing the embodiments herein is depicted in FIG. 3. This schematic drawing illustrates a hardware configuration of a computer architecture/system that is used cryptographically to verify the data structure in a decentralized network of FIG. 1 in accordance with the embodiments herein. The system comprises at least one processor or central processing unit (CPU) 10. The CPU's 10 are interconnected via a system bus 12 to various devices such as a random access memory (RAM) 14, a read-only memory (ROM) 16, and an input/output (I/O) adapter 18. The I/O adapter 18 optionally connects to peripheral devices, such as disk units 11 and tape drives 13, or other program storage devices that are readable by the system. The system can read the inventive instructions on the program storage devices and follow these instructions to execute the methods of the embodiments described herein.

The system further includes a user interface adapter 19 that connects a keyboard 15, a mouse 17, a speaker 24, a microphone 22, and/or other user interface devices such as a touch screen device (not shown) or a remote control to the system bus 12 to gather user input. Additionally, a communication adapter 20 connects the system bus 12 to a data processing network 25, and a display adapter 21 connects the system bus 12 to a display device 23 which is optionally be embodied as an output device such as a monitor, printer, or transmitter, for example.

Figure 4:
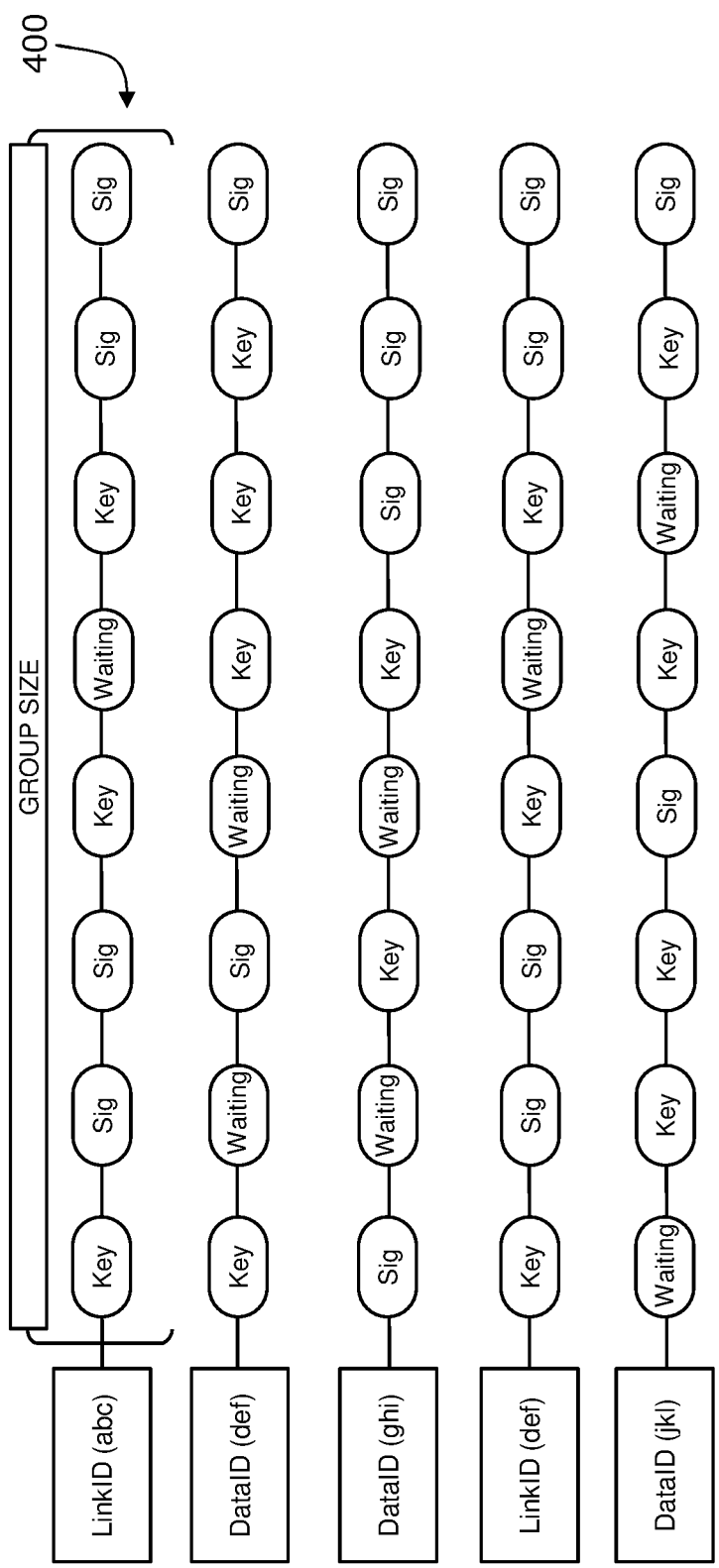
FIG. 4 is an exemplary flow diagram that illustrates a method of creating a data chain, in accordance with an embodiment of the present disclosure.

In FIG. 4, there is shown an exemplary flow diagram 400 that illustrates creation of a data chain, in accordance with an embodiment of the present disclosure.

In the hardware environment of FIG. 3, namely an example apparatus for implementing embodiments of the present disclosure, a LinkBlock Is used to identify specifically a change in group membership. Such an identification is achieved in operation by a given node sending a NodeAdded(nodename) or NodeLost(nodename) message; for example, the message is prepared and sent as a vote. The aforesaid message is then voted upon by group members until a quorum of nodes associated with the group members agree. Such an agreement forms a next LinkBlock and its associated group membership then becomes implicit in the chain.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An apparatus including one or more processors, where the one or more processors utilize one or more non-transitory computer readable storage mediums for storing one or more sequences of instructions, characterized in that execution of the one or more sequences of instructions by the one or more processors causes creation of a data chain which can be cryptographically proven to contain valid data while relocating the data from a switching off node to a live node during a churn event, the one or more processors configured to perform steps of:

creating a data chain with no elements in a data structure of a decentralized network;

validating the data chain for nodes before accepting the data chain, wherein the data chain is validated by a data identifier, wherein the data identifier cryptographically validates the data chain, wherein the data identifier is an object that uniquely identifies and validates the data chain;

verifying a size of a close group to add the data chain to the nodes;

adding a data block to the data chain;

injecting new elements into the data chain that represents a current close group of the data element;

removing old copies of data from the data chain to maintain consensus of the data chain by keeping the data in the data chain and marked as deleted;

validating a majority of pre-existing nodes to add the data chain to the node; and validating a signature of the data chain via the data chain of signed elements.

2. The apparatus of claim 1, characterized in that the instructions are further configured to verify non-deleted blocks.

3. The apparatus of claim 1, characterized in that a node data block of the data identifier comprises a public key or a signature pair.

4. The apparatus of claim 3, characterized in that the instructions are further configured to prove the public key to be the key that signed the data identifier using the signature as a proof.

5. The apparatus of claim 1, characterized in that, in operation, the instructions are further configured to:

(i) check an entry in (a) a cache of one or more data blocks, and (b) the data chain, wherein a receiving node checks for the entry in (a) a cache of one or more data blocks and (b) the data chain on receipt of the node data block;

(ii) add the node to data block when finding the entry in (a) a cache of one or more data blocks, and (b) the data chain; and (iii) create a new data block entry in the cache and await further notifications from group members of a data identifier when the entry is not identified.

6. The apparatus of claim 1, characterized in that, in operation, the instructions are further configured to:
(i) insert the data block into the data chain when a majority of signatories are accumulated in the data chain;
(ii) validate the data chain via the chain of signed elements where there is a majority of signatures, wherein the data chain is validated at each step, wherein the chain of majority signatures shows the entire chain is valid from the first element to the last element; and
(iii) maintain a security of each churn event in each node in a new group by signing an entry in the data chain in a current group.

7. The apparatus as claimed of claim 1, characterized in that the apparatus is operable to employ a LinkBlock that is used to identify specifically a change in group membership, wherein the identification is implemented by a given node sending a NodeAdded(nodename) or Nodelost(nodename) message as a vote, and wherein message is then voted upon by group members until a quorum of nodes associated with the group members agree, thereby forming a next LinkBlock and its associated group membership.

8. A method of creating a data chain which can be cryptographically proven to contain valid data while relocating the data from a switching off node to a live node during a churn event, in an apparatus including one or more processors, characterized in that the method comprises:
creating a data chain with no elements in a data structure of a decentralized network;
validating the data chain for nodes before accepting the data chain, wherein the data chain is validated by a data identifier, wherein the data identifier cryptographically validates the data chain, wherein the data identifier is an object that uniquely identifies and validates the data chain;
verifying a size of a close group to add the data chain to the nodes;
adding a data block to the data chain;
injecting new elements into the data chain that represents a current close group of the data element:
removing old copies of entries from the data chain only if a chained consensus would not be broken, else maintaining the entry and marking it as deleted;
validating a majority of preexisting pre-existing nodes to add the data chain to the node; and
validating a signature of the data chain via the data chain of signed elements.

9. A computer program product comprising a non-transitory computer readable storage medium having computer-readable instructions stored thereon, the computer-readable instructions being executable by a computerized device comprising processing hardware that causes creation of a data chain which can be cryptographically proven to contain valid data while relocating the data from a switching off node to a live node during a churn event, the processing hardware configured to:
create a data chain with no elements in a data structure of a decentralized network;
validate the data chain for nodes before accepting the data chain, wherein the data chain is validated by a data identifier, wherein the data identifier cryptographically validates the data chain, wherein the data identifier is an object that uniquely identifies and validates the data chain;
verify a size of a close group to add the data chain to the nodes;
add a data block to the data chain;
inject new elements into the data chain that represents a current close group of the data element;
remove old copies of data from the data chain to maintain consensus of the data chain by keeping the data in the data chain and marked as deleted;
validate a majority of pre-existing nodes to add the data chain to the node; and
validate a signature of the data chain via the data chain of signed elements.

10. The computer program product of claim 9, characterized in that the instructions are further configured to verify non-deleted blocks.

11. The computer program product of claim 9, characterized in that the instructions are further executable by a computerized device comprising processing hardware to verify non-deleted blocks.

12. The computer program product of claim 9, characterized in that the data identifier comprises a node data block including a public key or a signature pair.

13. The computer program product of claim 12, characterized in that the instructions are further executable by a computerized device comprising processing hardware to prove the public key to be the key that signed the data identifier using the signature as a proof.

14. The computer program product of claim 9, characterized in that, the instructions are further executable by a computerized device comprising processing hardware to:
(i) check an entry in (a) a cache of one or more data blocks, and (b) the data chain, wherein a receiving node checks for the entry in (a) a cache of one or more data blocks and (b) the data chain on receipt of the node data block;
(ii) add the node to data block when finding the entry in (a) a cache of one or more data blocks, and (b) the data chain; and
(iii) create a new data block entry in the cache and await further notifications from group members of a data identifier when the entry is not identified.

15. The computer program product of claim 9, characterized in that, the instructions are further executable by a computerized device comprising processing hardware to:
(i) insert the data block into the data chain when a majority of signatories are accumulated in the data chain;
(ii) validate the data chain via the chain of signed elements where there is a majority of signatures, wherein the data chain is validated at each step, wherein the chain of majority signatures shows the entire chain is valid from the first element to the last element; and
(iii) maintain a security of each churn event in each node in a new group by signing an entry in the data chain in a current group.

16. The computer program product of claim 9, characterized in that the instructions are further executable by a computerized device comprising processing hardware to:
with a LinkBlock, identify specifically a change in group membership by sending a NodeAdded(nodename) or Nodelost(nodename) message from a given node as a vote; and
vote upon the message by group members until a quorum of nodes associated with the group members agree, thereby forming a next LinkB lock and its associated group membership.

* * * * *